Figure 1:
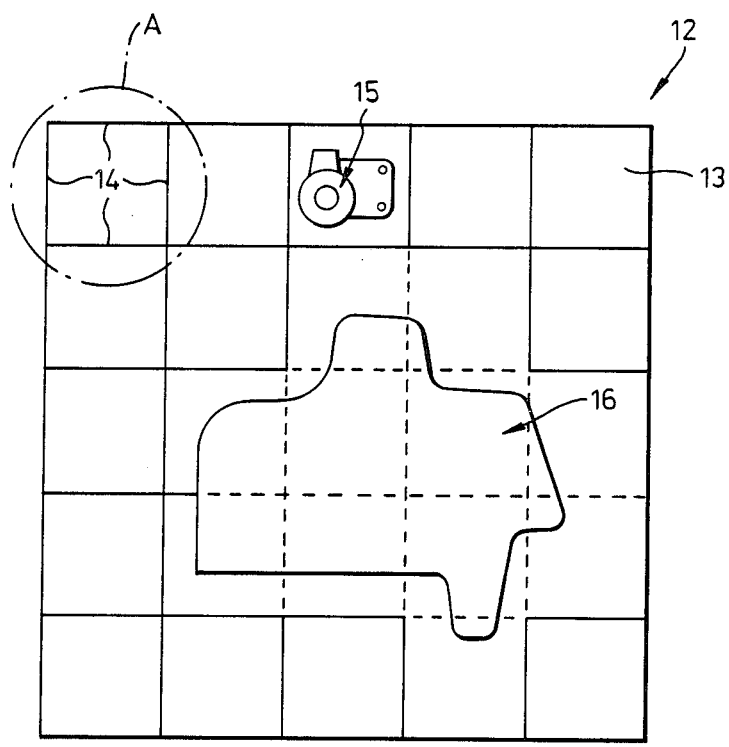

United States Patent [19]

Ballard et al.

[11] Patent Number: 4,774,892
[45] Date of Patent: Oct. 4, 1988

[54] ARTICLE RESTRAINING MEANS FOR PALLETS

[75] Inventors: Richard L. Ballard, Bridgwater; Mark Goddard-Watts, Yeovil; David N. Hallett, Keynsham, all of United Kingdom

[73] Assignee: Westland plc, Yeovil, England

[21] Appl. No.: 32,610

[22] Filed: Apr. 1, 1987

[30] Foreign Application Priority Data

Apr. 17, 1986 [GB] United Kingdom ............... 8609356

[51] Int. Cl.⁴ ............................................ B65D 19/44
[52] U.S. Cl. .................... 108/55.3; 108/55.1
[58] Field of Search ............... 108/55.3, 55.1, 55.5, 108/56.3, 54.1, 51.1; 206/386, 598, 595, 596; 248/346

[56] References Cited

U.S. PATENT DOCUMENTS

| | | | |
|---|---|---|---|
| 3,650,224 | 3/1972 | Petix et al. | 108/56.1 X |
| 3,690,485 | 9/1972 | Fischer et al. | 108/51.1 X |
| 4,015,710 | 4/1977 | Biggs | 108/55.5 X |
| 4,347,794 | 9/1982 | Nordström | 108/55.1 X |
| 4,393,999 | 7/1983 | Forshee | 108/55.3 X |
| 4,397,246 | 8/1983 | Ishida et al. | 108/55.3 |
| 4,478,156 | 10/1984 | Andersson | 108/55.3 X |
| 4,580,680 | 4/1986 | Wind | 108/55.3 X |

FOREIGN PATENT DOCUMENTS

| | | | |
|---|---|---|---|
| 1556347 | 1/1970 | Fed. Rep. of Germany | 108/55.3 |
| 2556990 | 6/1977 | Fed. Rep. of Germany | 108/55.3 |

Primary Examiner—Kenneth J. Dorner
Assistant Examiner—José V. Chen
Attorney, Agent, or Firm—Larson and Taylor

[57] ABSTRACT

A pallet (12) for an automated transportation apparatus includes resilient restraining means (14) protruding from an upper load carrying surface (13) to prevent sliding movement of an article on the surface.

6 Claims, 2 Drawing Sheets

ARTICLE RESTRAINING MEANS FOR PALLETS

This invention relates to pallets and is particularly concerned with pallets for transporting articles in automated transportation apparatus.

To avoid confusion the use of the term article in this specification is intended to include an article itself or an article holding device which is sometimes used to enable unstable articles to be transported.

EP-A No. 0128999 discloses a prior transportation system and pallet and is concerned particularly with constructional features of the pallet which has a generally planar upper load carrying surface.

One of the problems with such a pallet is that accelerations resulting from the stop-start nature of pallet movement cause instability especially in respect of lateral sliding movement of the articles on the pallets, even in the case of normally stable articles. The problem is not entirely overcome by the use of holding devices for inherently unstable articles since the holding device itself is of course subject to the accelerations so that it too is unstable at least as far as lateral sliding movements are concerned.

Another problem concerns the need to cater for different sized articles and for articles having a wide variety of different shapes.

Accordingly a pallet for transporting articles in an automated transporation apparatus is characterised by resilient restraining means on an upper load carrying surface adapted to prevent sliding movement of an article on the surface.

Preferably the restraining means comprise a plurality of restraining bars protruding from said load carrying surface whereby individual restraining bars within the surface area of an article carried on the pallet are depressed to a position substantially flush with the load carrying surface and said prevention of lateral sliding movement is provided by the protruding restraining bars externally of said area. Spring means may be associated with each restraining bar to urge the bars to protrude from the load carrying surface.

The restraining bars may be arranged in a grid pattern and, preferably, the grid may comprise a plurality of rectangular areas.

The restraining bars may be of contrasting colour or surface finish relative to the load carrying surface of the pallet in order to enhance the properties of the grid arrangement which is already well suited to identify pallet areas for computer control by presenting a good image for computer vision systems.

The restraining bars may protrude through slots in the upper load carrying surface and said slots in cross section may have an inverted T-shape. In such an embodiment the restraining bars conveniently have a T-shape arranged with the enlarged portion located in the lowermost portion of the slot so as to limit protrusion of the restraining bars from the upper surface to a predetermined amount. The spring means may be located between facing surfaces of said restraining bar enlarged portion and an adjacent surface of said pallet. The slots may be formed between edges of a plurality of rectangular blocks attached to a pallet base plate.

Preferably the sides of each grid are defined by individual restraining bars with intermediate restraining bars being common to adjacent grid areas. The ends of the restraining bars may be pointed in plan so as to interlock neatly at the corners of the grid.

Figure 2:
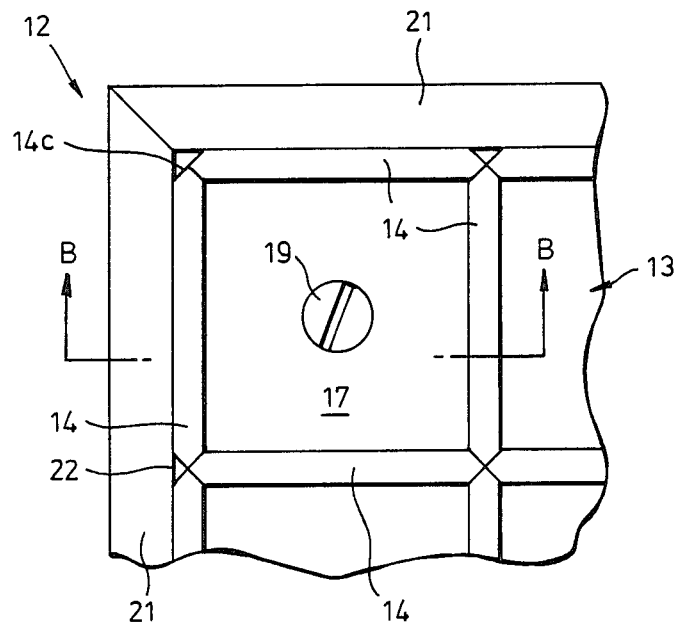
Figure 3:
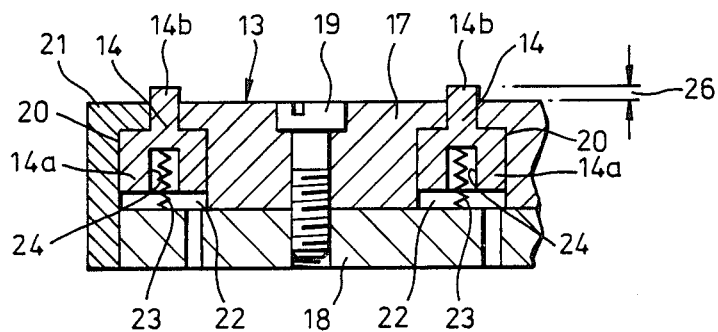

The invention will now be described by way of example only and with reference to the accompanying drawings in which, FIG. 1 is a schematic plan view of a pallet for transporting articles in an automated transporation apparatus, FIG. 2 is a fragmentary view of the part of the pallet of FIG. 1 enclosed within area A of FIG. 1 on an enlarged scale, and FIG. 3 is a fragmentary sectioned view taken along lines B—B of FIG. 2.

A pallet 12 for use in an automated transportation apparatus has an upper load carrying surface 13 provided with restraining means comprising a plurality of individual spring loaded restraining bars 14 arranged in a grid pattern.

The restraining bars 14 normally protrude about 2.0 mm above the surface 13 to provide lateral restraint against sliding movement of an article on the load carrying surface 13. As schematically illustrated in FIG. 1, a small generally stable article 15 can be located between the restraining bars 14 of a single square of the grid whereas a larger generally stable article 16 will depress the restraining bars 14 lying within its surface area (indicated by broken lines in FIG. 1) to a position substantially flush with the surface 13 so that lateral restraint is still provided by adjacent protruding restraining bars 14 surrounding the component 16 externally of its surface area.

In the case of unstable articles requiring holding devices such as apertured blocks (not shown) it will be apparent that the devices can be sized to cover one or more of the grid squares so that again lateral restraint to prevent sliding is provided by the protruding restraining bars 14 surronding the holding device. Similarly, also, restraining bars 14 lying within the surface area of the holding device will be depressed flush with the surface 13.

Referring now to FIGS. 2 and 3 it will be seen that load carrying surface 13 of pallet 12 is provided by an upper surface of a plurality of square blocks 17 secured to a base plate 18 by a centrally located bolt 19. The edges of the blocks 17 are recessed at 20 in order to form in combination with adjacent blocks 17 or shaped edge plate 21, inverted T-shaped slots 22 arranged in a grid pattern comprising a plurality of equally sized squares. The edge plates 21 are of generally inverted 'L' shape and are bolted to the edges of the base plate 18 to form the slot 22 that defines the outer extremity of the grid.

The restraining bars 14 are located in the T-shaped slots 22. As shown in FIG. 3, the restraining bars 14 in cross section are also T-shaped and arranged with the enlarged portion 14a located in the lowermost portion of the slot 22 with freedom for vertical sliding movement and an upper portion 14b which extends through the slot 22 and is capable of protruding from the upper surface 13 by about 2.00 mm as indicated at 26. Two compression springs 23 are located in recesses 24 in the lowermost surface of the restraining bars 14 and act against the facing surface of the base plate 18 to normally retain the retaining bar 14 with the upper end 14b protruding above surface 13 by the aforementioned predetermined amount.

As shown in FIG. 2, each square of the grid is defined by four individual spring loaded restraining bars 14, with intermediate bars 14 being common to adjacent grid squares. The ends of all of the restraining bars 14 are pointed as at 14c so as to interlock neatly at the corners of the grid squares.

The grid arrangement is well suited to identifying pallet areas for computer control and, by ensuring that the restraining bars 14 are made to be easily distinguishable from the surface 13 e.g. by a black anodic treatment, a good image is presented for computer vision systems. This means that during operation a controlling computer system can easily identify a required grid area and can carry out a visual analysis of that area.

Attachment means (not shown) are provided on the base plate 18 in order to attach the pallet 12 to a power driven transportation apparatus such as a conveyor system.

One particular pallet construction consists of a one hundred square (i.e. 10×10 matrix) grid with a nominal size for each grid square of 50 mm×50 mm in a pallet of 500 mm×500 mm overall size. Thus, this invention provides, in an automated transportation apparatus, a pallet which provides automatic lateral restraint for a wide variety of articles or article holding devices having widely differing shapes and sizes, thereby resulting in an extremely flexible transportation apparatus.

Whilst one embodiment of the invention has been described and illustrated it will be understood that modifications may be made without departing from the scope of the invention as defined by the appended claims. For example, the two compression springs 23 associated with each restraining bar 14 may be replaced by other suitable means such as a single leaf spring or by an insert of resilient material such as rubber, and the bolts 19 may be inserted through the base plate 18 so as to provide an uninterrupted upper load carrying surface 13. Furthermore, other forms of resilient restraining means may be used, for example, the movable restraining bars may be replaced either by bars of resilient material such as soft rubber attached to the load carrying surface, or by a plurality of spring loaded protruding posts capable of being depressed to a position substantially flush with the load carrying surface.

What is claimed is:

1. A pallet for transporting articles in an automated transportation apparatus including an upper load carrying surface, a plurality of elongated slots disposed in said surface, means slidably disposed in said slots for restraining articles on said upper load carrying surface, said restraining means including a plurlaity of restraining bars and spring means within said slots urging said restraining bars to a protruding position, said spring means being compressed by articles disposed on restraining bars whereby individual restraining bars within surface areas of articles on the load carrying surface are depressed to a position substantially flush with the surface and restraining bars outside of the surface areas of articles on the load carrying surface protrude from the load carrying surface to prevent sliding movement of the articles.

2. A pallet as claimed in claim 1, wherein said spring means is located between facing surfaces of said restraining bar and an adjacent surface of a pallet base plate (18).

3. A pallet as claimed in claim 2, wherein said slots are formed between edges of a plurality of rectangular blocks attached to the pallet base plate.

4. A pallet as claimed in claim 1, wherein the ends of individual restraining bars are tapered so as to interlock at the corners of the grid.

5. A pallet as claimed in claim 1 wherein said restraining bars are arranged in a rectangular grid pattern having generally perpendicular corners, the sides of the grid pattern being defined by individual restraining bars with intermediate restraining bars within the rectangular and pattern being common to adjacent grid areas.

6. A pallet as claimed in claim 1 wherein said slots in cross section have an inverted T-shape and said restraining bars have a complementary T-shape arranged for sliding location in said slot and so as to limit protrusion of the restraining bars to said predetermined amount.

* * * * *